N. CHRISTENSEN.
RIPENER FOR MOTHER STARTER.
APPLICATION FILED OCT. 5, 1918.

1,336,728. Patented Apr. 13, 1920.

Inventor:
N. Christensen.
by Edgar M. Kitchin
Attorney.

UNITED STATES PATENT OFFICE.

NIELS CHRISTENSEN, OF LIMA, OHIO.

RIPENER FOR MOTHER-STARTER.

1,336,728. Specification of Letters Patent. Patented Apr. 13, 1920.

Application filed October 5, 1918. Serial No. 257,020.

*To all whom it may concern:*

Be it known that I, NIELS CHRISTENSEN, a citizen of the United States, residing at Lima, in the county of Allen and State of Ohio, have invented certain new and useful Improvements in Ripeners for Mother-Starter; and I do hereby declare the following to be a full, clear, and exact description of the invention, such as will enable others skilled in the art to which it appertains to make and use the same.

The present invention relates to a device for use in creameries for ripening or preparing what is known as "mother starter." This "mother starter" is a milk in which some particular culture is dominant over other bacteria. The lactic bacteria produce the flavor that is desirable in butter, and hence mother starter rich in this lactic bacteria is often called butter flavor. An effort is made in butter manufacture to sour the milk under conditions most favorable to the growth of this particular bacteria and most unfavorable to the growth of harmful bacteria. This souring is done by inoculation with another starter.

The lactic bacteria or ferment is also useful in making commercial buttermilk. What is known as the "*Bulgaricus* ferment" is also employed to make buttermilk, but this ferment is not so desirable for butter making as the lactic bacteria. The lactic ferment bacteria are most active at temperatures ranging from 60° to 70° Fahr., while the *Bulgaricus* are most active from 70° to 80° Fahr. There are, therefore, different grades of "starter" and it is an object of my invention to provide an apparatus adapted to receive milk cultures and to hold these cultures in separate containers subjected to uniform heat which may be different for the several containers in order that any particular grade of starter may be produced.

It is another object of my invention to provide an improved apparatus that will enable me to prepare a pure lactic ferment culture that will keep indefinitely, will not have to be renewed daily, as is necessary with the use of the well known "starter can," and will not be susceptible to injury or destruction by the atmospheric changes of temperature.

My invention seeks to maintain uniformity and perfection in the ferment culture used for butter making and cheese making as well as for preparing delicacies and healthful commercial buttermilk.

The accompanying drawings show one form of an apparatus for carrying out the above-described purposes. In these drawings, wherein like numerals are used to designate like parts throughout the several views,—

Figure 1:
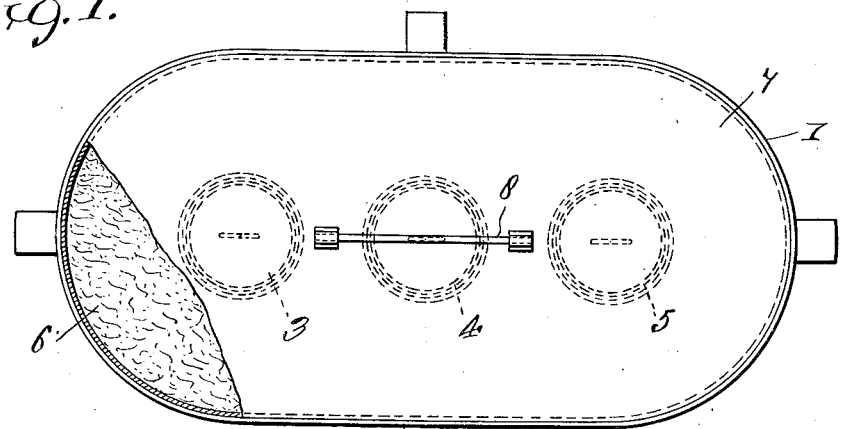
Figure 1 is a top plan view, partly in section.
Figure 2:
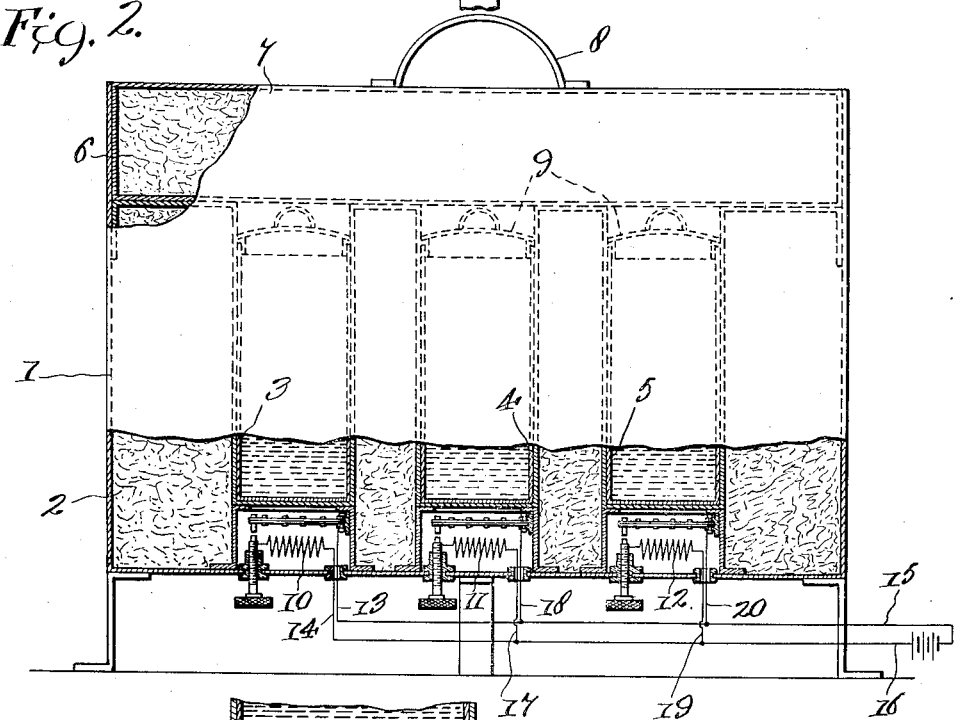
Fig. 2 is a side elevational view also partly in section.

Referring more particularly to the drawings, 1 designates a cabinet made of appropriate material and mounted on suitable supports in a position convenient for use. The interior of this cabinet 1 is filled with a body of heat insulating material 2, such as asbestos or fire-clay, and in this insulating body I make openings of the size necessary to receive cans or containers of predetermined capacities. In the present drawings these cans or containers are shown to be three in number and are referred to by different symbols 3, 4 and 5, although it will be understood that a greater or lesser number may be employed. The openings in the material 2 are made at locations spaced from one another and from the side walls of the cabinet 1 in order that each container may be horizontally surrounded and isolated completely from adjacent containers. The bottoms of the openings referred to are spaced vertically above the bottom of the cabinet.

The insulating material 2 does not, however, extend to the top of the cabinet 1, but preferably has its upper surface lying at a considerable distance below such top, which leaves a chamber in the upper portion of said cabinet that is adapted to receive and be filled by a second body of insulating material 6 carried by and removable with the cover 7. A handle 8 is supplied for convenience in removing and replacing this cover. When the cover is withdrawn the arrangement is such that the cans or containers 3, 4 and 5 will be exposed and their closures 9 may be lifted off to give access to their interiors for the purpose of supplying them with the cultures to be treated, or removing the same subsequent to treatment; or the containers may be themselves taken out and the contents decanted. Incidentally I prefer to make the containers of aluminum as producing the least deleterious effect upon the cultures.

Previous to placing the cultures in the containers such cultures are brought to the temperature necessary to develop the bacteria desired, and while at this temperature the same are poured into the containers and the cover is thereupon put in place. The insulation will prevent, or so greatly retard the dissipation of heat that, excepting in cold weather, the cultures will be maintained at the temperature to which heated for a long period of time, sufficient for adequate germination. The preliminary heating of the cultures may, however, be accomplished in the containers if desired, and for this purpose heaters are supplied. These heaters are also of value in maintaining the temperatures in cold weather.

Figure 3:
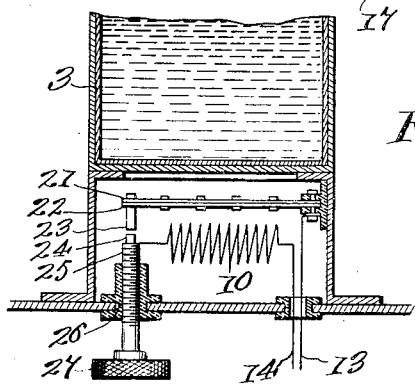
Fig. 3 is an enlarged sectional view showing a detail.

The form of heater I prefer to employ is an electric heater and conformably to my preference I place electric resistance coils 10, 11 and 12 beneath the containers, such coils being arranged in multiple and receiving current from a suitable source. The coil 10 is shown as joined by leads 13 and 14 to the two branches 15 and 16 of an electric main. Similarly the coil 11 under the container 4 receives its current through leads 17 and 18 and a pair of leads 19 and 20 serve to connect the third coil 12 to the electric main. Suitable current regulators or controls are also associated with the coils 10, 11 and 12 and it is desirable that some such adjustable automatic thermostats as shown be used. The preferred form of thermostat is shown particularly in Fig. 3, wherein a contact arm made up of elongated strips 21 and 22 of dissimilar metals, having different coefficients of expansion, united together by suitable fastenings, is connected in circuit with the coil 10 and carries a contact point 23 normally closed against a second contact point 24 carried by a post 25 threaded for adjustment through a suitable part 26. The contact point 24 is, of course, connected to the opposite side of the coil so that current may traverse the coil when the two contacts are together. The contact arm is arranged above the coil and receives the full effect of its heat. When a predetermined temperature is reached, the unequal expansion developed in the two metals in the contact arm will cause such bar to warp or bend upwardly, withdrawing the contact points and opening the circuit. The coil 10 is in this event cut out and the temperature will be allowed to fall until it no longer is above the desired degree. Contraction will take place with cooling in the contact arm and the circuit will be restored through the coil 10. The variations in the temperature necessary to actuate said arm will be slight and inappreciable in their effect on the culture within the container and a uniform temperature is the result. Knobs 27 are carried by the posts 26 on the exterior of the cabinet so that they are exposed for adjustment. By rotating the knobs 27 the position of the contact point 24 may be varied with reference to the companion contact point 23. When the post is raised, a greater amount of heat will be allowed to develop before the arm will be raised sufficiently to break the circuit. The lowering of the post will have an opposite effect and the temperature will be uniformly lower. The micrometer adjustment afforded by the screw post is extremely advantageous in the treatment of cultures where nice regulation of temperature is necessary to secure the proper results and the thermostatic arrangement shown and above described renders it practicable to secure a constant temperature to which the culture is uniformly subjected and without which proper development of the bacteria is impossible.

The large aluminum containers form vertually storage receptacles in which the cultures may be kept indefinitely and from which samples may be taken from time to time to act as "starters" in the souring of milk for various purposes. The lactic ferment for instance may be kept in the container 3 and *Bulgaricus* ferment in the container 4. These containers, while held in the same cabinet 1 are nevertheless so effectively isolated that the transfer of heat between same will not be practicable and the necessary temperature, say 60° F., may be maintained in container 3, while a temperature of 70° F. is maintained in the container 4. The thermostat beneath the receptacle 3 may be set to furnish through the coil 10 a constant temperature of 60° F. Likewise, the thermostat associated with the coil 11 is regulated to give 70° F. The third container and its heater may be so adjusted that its contents is kept at some different temperature without affecting the contents of the other container and a different ferment be produced.

The apparatus provides for the production of different grades of starter at the same time and the preservation of the cultures in a pure condition indefinitely. By keeping the cultures constantly at their respective temperatures the apparatus avoids the injury and destruction brought about by atmospheric changes, and maintains uniformity and perfection in the cultures.

What I claim is:—

1. An apparatus for ripening mother starter comprising a cabinet, insulation in the cabinet having a plurality of separated and isolated openings therein, a plurality of containers for holding different grades of mother starter set in said openings, a cover for the cabinet, a body of insulating material carried by the cover and closing in common all of the openings, and means whereby the different grades of mother starter in the different containers may be preserved at different temperatures respectively most favorable for the development of each separate culture.

2. A ripener for mother starter comprising a plurality of containers for holding different grades of starter, a common cabinet for holding said containers, heat-insulating material in the cabinet for isolating said containers whereby one container may be kept at a desired temperature different from and independent of the other containers, means to heat the containers individually to the particular temperature most favorable to the development of the grades of starter desired, and means to regulate the heating means whereby the several temperatures may automatically be kept constant.

3. A ripener for mother starter consisting of a cabinet having insulating material therein with holes made vertically therethrough, containers in the holes isolated from one another by the insulating material and having their bottoms held elevated above the bottom of the cabinet forming segregated spaces, resistance coils placed in such segregated spaces beneath the containers, a source of current in connection with said coils, and automatic means to regulate the passage of current through the coils.

4. A ripener for mother starter including a cabinet, means for supporting the cabinet with its bottom at an elevation above the floor, a body of heat insulating material placed in the cabinet and leaving a space between the upper portion of the material and the top of the cabinet, said body of insulating material having a plurality of openings made substantially vertical therein and extending from the upper portion of the material to the bottom of the cabinet, containers for different grades of mother starter individually placed in the openings in said insulating material and having the bottoms thereof supported at an elevation above the bottom of the cabinet whereby to form spaces therebetween, a hollow cover for the cabinet adapted to fit within the upper portion thereof above the heat insulating material and adapted to rest on such material, a body of heat insulating material in said hollow cover, electric coils placed individually in the spaces beneath said containers, a common source of current for energizing said individual coils, and individual thermostats in the spaces beneath said containers and arranged above the coils, said thermostats including each an arm composed of dissimilar metals adapted to expand unequally and cause the warping of the arm, a pair of contacts, one contact being carried by said arm, and an adjustable screw carrying the other of said contacts.

In testimony whereof I affix my signature in presence of two witnesses.

NIELS CHRISTENSEN.

Witnesses:
 TIRZAH K. SANFORD,
 OLGA M. CHRISTENSEN.